United States Patent
Anderson et al.

(10) Patent No.: US 10,897,474 B2
(45) Date of Patent: Jan. 19, 2021

(54) ADAPTING CLASSIFIER PARAMETERS FOR IMPROVED NETWORK TRAFFIC CLASSIFICATION USING DISTINCT PRIVATE TRAINING DATA SETS

(71) Applicant: Cisco Technology, Inc., San Jose, CA (US)

(72) Inventors: Blake Harrell Anderson, San Jose, CA (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 260 days.

(21) Appl. No.: 15/191,129

(22) Filed: Jun. 23, 2016

(65) Prior Publication Data

US 2017/0374089 A1    Dec. 28, 2017

(51) Int. Cl.
  *H04L 29/06* (2006.01)
  *H04L 29/12* (2006.01)
  (Continued)

(52) U.S. Cl.
  CPC ......... *H04L 63/1425* (2013.01); *G06N 20/00* (2019.01); *H04L 63/145* (2013.01);
  (Continued)

(58) Field of Classification Search
  CPC ... H04L 63/1425; H04L 67/02; H04L 63/145; H04L 47/31; H04L 47/2483;
  (Continued)

(56) References Cited

U.S. PATENT DOCUMENTS 7,366,174 B2    4/2008  MacFaden et al.
8,402,543 B1 *  3/2013  Ranjan ............... H04L 63/1416
                                                  726/23
(Continued)

FOREIGN PATENT DOCUMENTS

CN       103973589 A      8/2014
WO    WO-2016004075 A1    1/2016

OTHER PUBLICATIONS

Gu et al. "Detecting Anomalies in Network Traffic Using Maximum Entropy Estimation" Department of Computer Science, University of Massachusetts; pp. 1-6.
(Continued)

*Primary Examiner* — Tonia L Dollinger
*Assistant Examiner* — Mehulkumar J Shah
(74) *Attorney, Agent, or Firm* — Behmke Innovation Group LLC; Kenneth J. Heywood; James J. Wong

(57) ABSTRACT

In one embodiment, a device in a first network receives traffic flow information regarding a plurality of traffic flows in the first network. The device labels the traffic flow information by associating classifier labels to the traffic flow information. The device receives a generic traffic classifier that was trained using a training data set that comprises labeled traffic flow information for a plurality of other networks and excludes the traffic flow information regarding the plurality of traffic flows in the first network. The device acclimates the generic traffic classifier to the first network using the labeled traffic flow information regarding the plurality of traffic flows in the first network.

20 Claims, 7 Drawing Sheets

(51) Int. Cl.
   *H04L 12/833*   (2013.01)
   *H04L 12/851*   (2013.01)
   *H04L 29/08*    (2006.01)
   *G06N 99/00*    (2019.01)
   *G06N 20/00*    (2019.01)

(52) U.S. Cl.
   CPC .......... *H04L 47/2483* (2013.01); *H04L 47/31* (2013.01); *H04L 63/1458* (2013.01)

(58) Field of Classification Search
   CPC ..... H04L 61/2015; H04L 29/06; H04L 29/12; H04L 12/833; H04L 12/851; H04L 29/08; H04L 29/08981; H04L 29/08072; H04L 41/0806; H04L 63/1458; G06N 99/005; G06N 99/00; G06N 20/00; G06F 9/4416
   USPC ......... 709/222, 220; 713/1; 710/104; 717/11
   See application file for complete search history.

(56) References Cited

U.S. PATENT DOCUMENTS

| | | | |
|---|---|---|---|
| 9,191,468 B2 | 11/2015 | Suarez Fuentes et al. | |
| 9,900,342 B2* | 2/2018 | Cruz Mota | H04L 63/1458 |
| 10,419,351 B1* | 9/2019 | Baldi | H04L 69/22 |
| 2011/0019574 A1* | 1/2011 | Malomsoky | H04L 47/2441 |
| | | | 370/252 |
| 2014/0198656 A1* | 7/2014 | Venkatesh | H04L 45/30 |
| | | | 370/235 |
| 2014/0222997 A1* | 8/2014 | Mermoud | H04L 41/147 |
| | | | 709/224 |
| 2015/0215804 A1* | 7/2015 | Ideses | H04L 47/803 |
| | | | 370/230 |
| 2015/0244733 A1* | 8/2015 | Mohaisen | G06F 21/561 |
| | | | 726/23 |
| 2015/0339577 A1* | 11/2015 | Waltinger | G06N 20/00 |
| | | | 706/12 |
| 2016/0134524 A1* | 5/2016 | Beshai | H04L 45/44 |
| | | | 370/406 |
| 2017/0353480 A1* | 12/2017 | Gao | H04L 63/1425 |
| 2017/0374089 A1* | 12/2017 | Anderson | G06N 20/00 |

OTHER PUBLICATIONS

Sommer et al. "Outside the Closed World: On Using Machine Learning for Network Intrusion Detection" International Computer Science Institute; pp. 1-12.

Patcha et al. "An Overview of Anomaly Detection Techniques: Existing Solutions and Latest Technological Trends" Computer Networks; Jun. 8, 2006; pp. 1-25.

Oriol Mula-Valls "A practical retraining mechanism for network trac classication in operational environments" Master Thesis—Master in Computer Architecture, Networks and Systems; Jun. 2011; pp. 1-47.

Valentin Carela-Espanol "Network Traffic Classication: From Theory to Practice" Universitat Politecnica de Catalunya BarcelonaTech Department d'Arquitectura de Computadors; Oct. 2014; pp. 1-197.

* cited by examiner

ADAPTING CLASSIFIER PARAMETERS FOR IMPROVED NETWORK TRAFFIC CLASSIFICATION USING DISTINCT PRIVATE TRAINING DATA SETS

TECHNICAL FIELD

The present disclosure relates generally to computer networks, and, more particularly, to adapting classifier parameters for improved network traffic classification using distinct private training data sets.

BACKGROUND

Computer networks are carrying an ever increasing number of traffic flows with diverse characteristics. In many cases, these characteristics are benign, such as user generated Hypertext Transfer Protocol (HTTP) flows to benign servers. In other cases, traffic flows can also exhibit malicious characteristics, such as flows associated with malware, data exfiltration, denial of service (DoS) attacks, etc.

Capturing traffic characteristics improves the functioning of the network by enabling network devices and network administrators to adjust the operations of the network dynamically. For example, a router or other networking device may leverage information about the application associated with a particular traffic flow, to prioritize communication of the flow (e.g., video conferencing traffic may be much more sensitive to jitter or delays than that of email traffic). In another example, a networking device may use the captured traffic information to detect, and often prevent, network attacks and other anomalies in the network. In both examples, classification is typically performed in real-time or in near real-time, allowing the network to adapt quickly to changes in the traffic flows and the traffic flow characteristics that are present in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
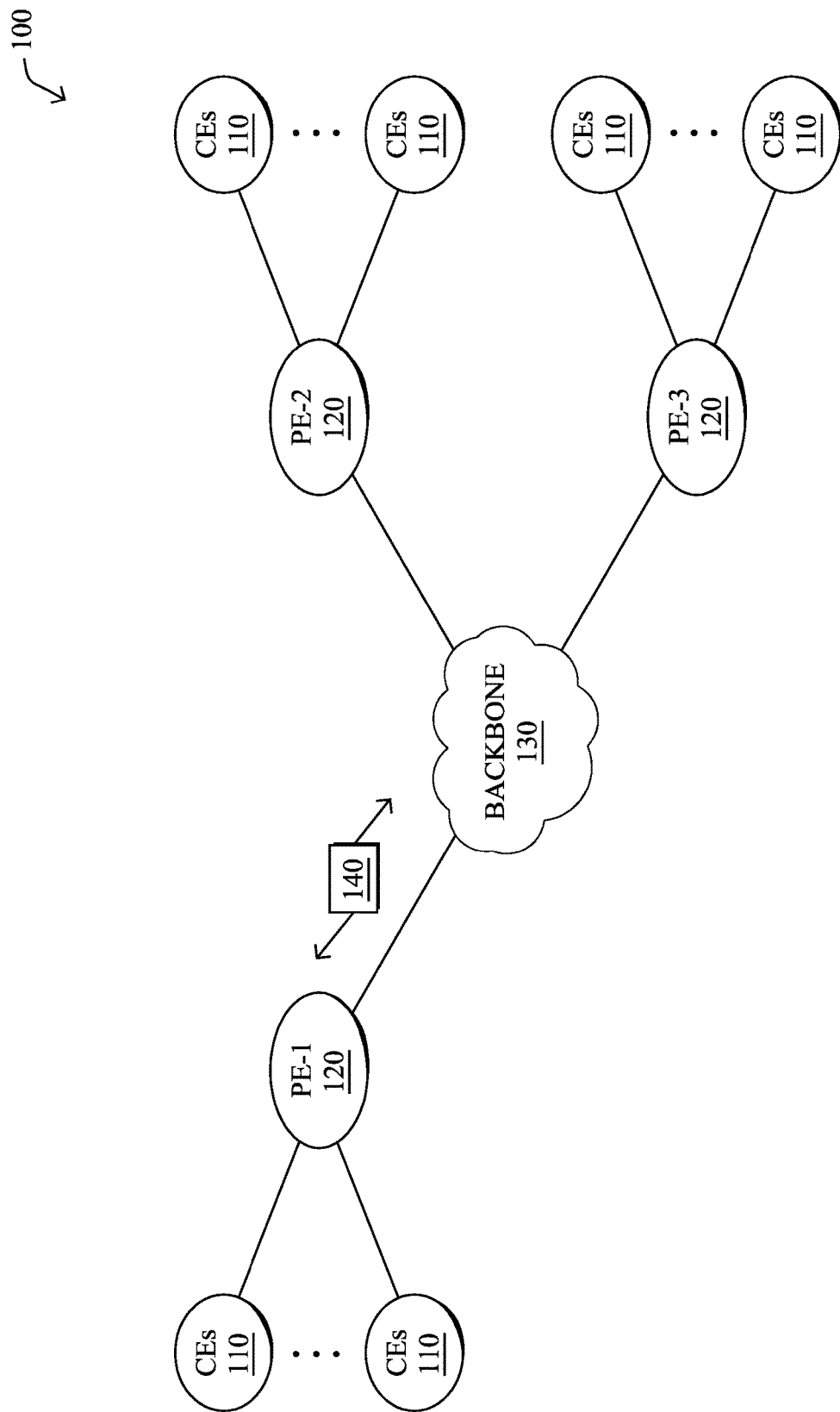
FIGS. 1A-1B illustrate an example communication network.

According to one or more embodiments of the disclosure, a device in a first network receives traffic flow information regarding a plurality of traffic flows in the first network. The device labels the traffic flow information by associating classifier labels to the traffic flow information. The device receives a generic traffic classifier that was trained using a training data set that comprises labeled traffic flow information for a plurality of other networks and excludes the traffic flow information regarding the plurality of traffic flows in the first network. The device acclimates the generic traffic classifier to the first network using the labeled traffic flow information regarding the plurality of traffic flows in the first network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
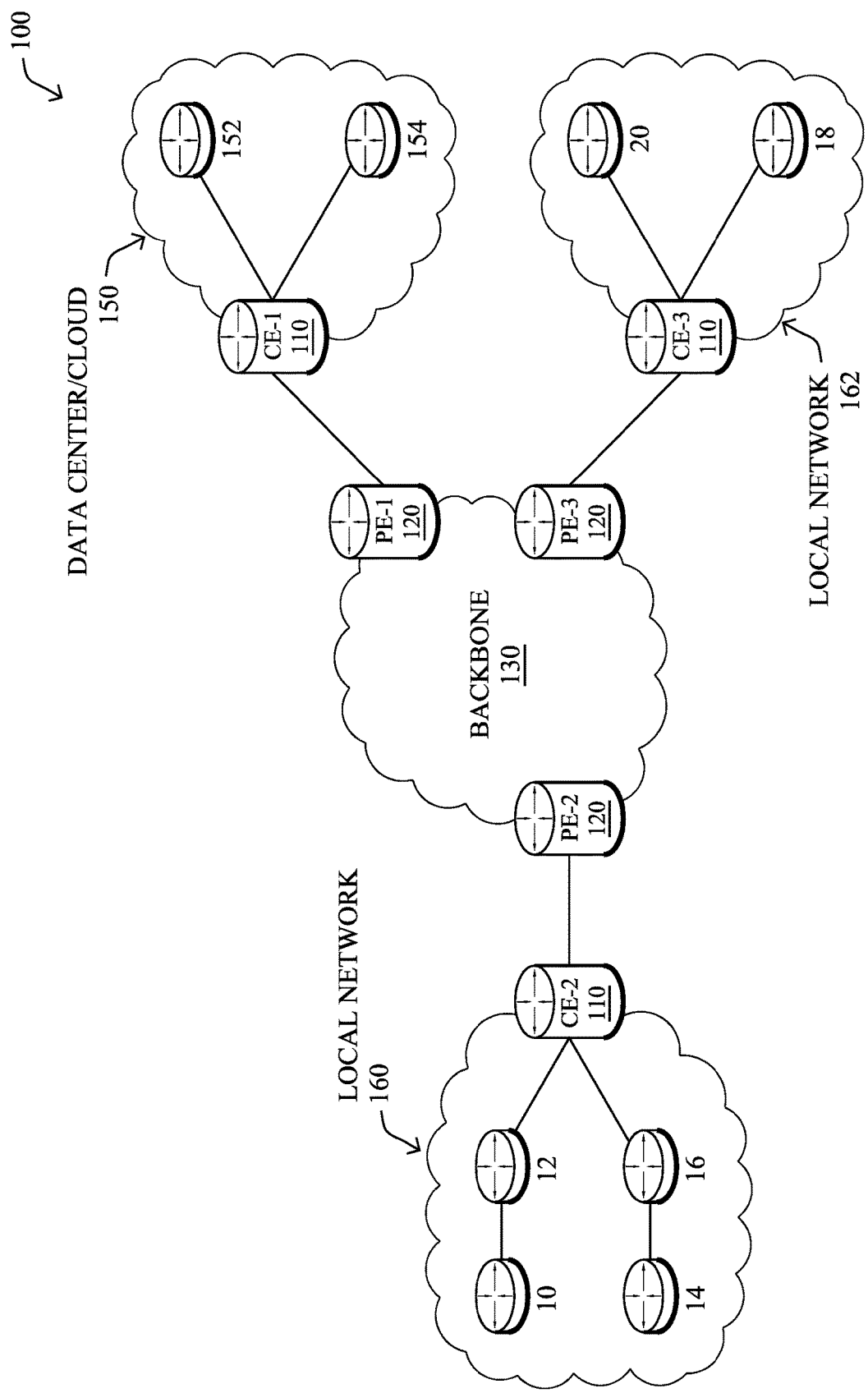

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
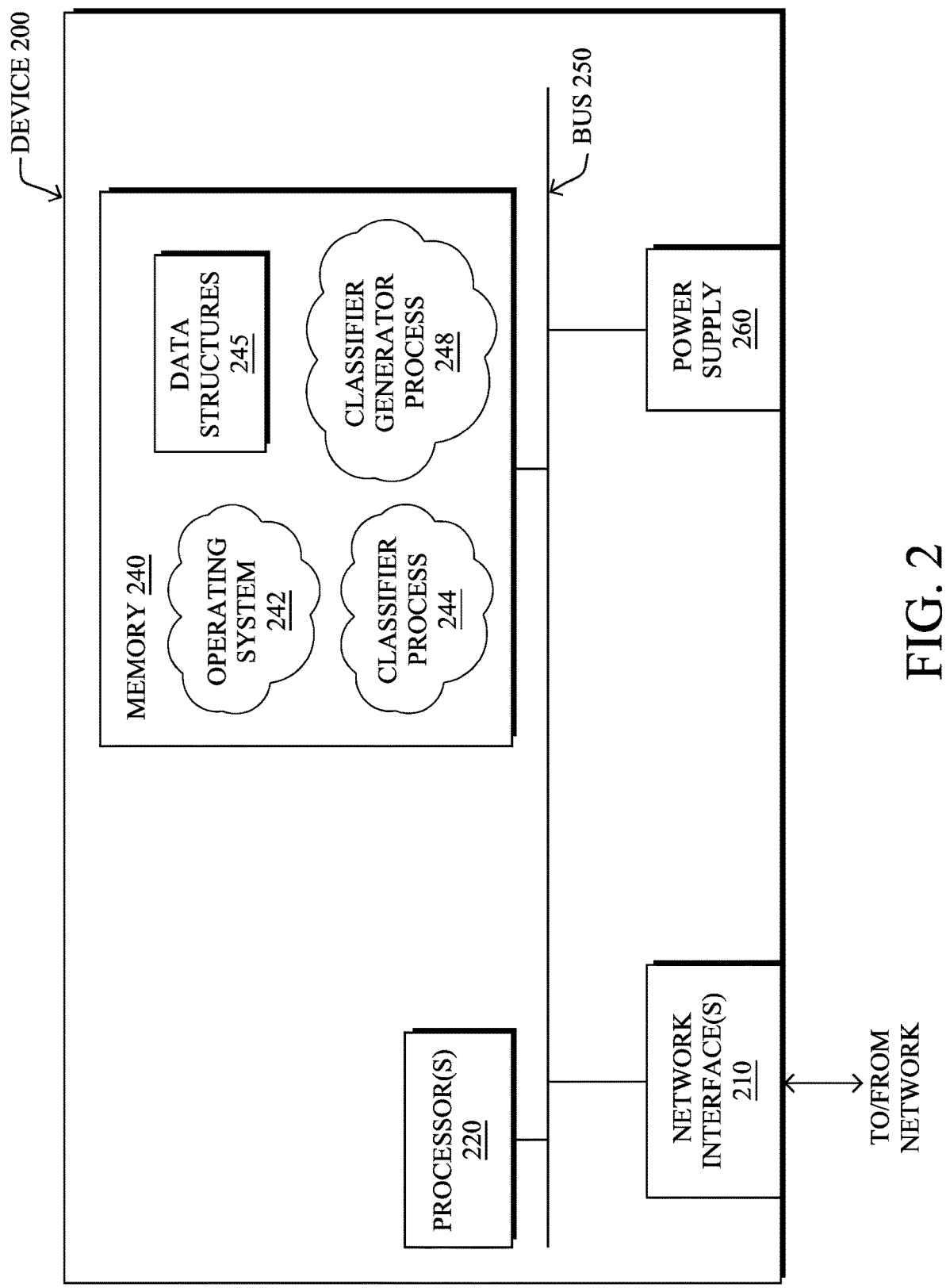
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a classifier process 244 and/or a classifier generator process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, classifier process 244 may execute one or more machine learning-based classifiers to classify traffic data regarding traffic in the network for any number of purposes. In one embodiment, classifier process 244 may assess captured traffic data to determine whether a given traffic flow or set of flows are caused by malware in the network. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a denial of service (DoS) attack, combinations thereof, or the like. In further embodiments, classifier process 244 may classify the gathered traffic data to detect other anomalous behaviors (e.g., malfunctioning devices, misconfigured devices, etc.), traffic pattern changes (e.g., a group of hosts begin sending significantly more or less traffic), or the like.

Classifier process 244 may employ any number of machine learning techniques, to classify the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, classifier process 244 can use the model M to classify new data points, such as information regarding new traffic flows in the network. Often, M is a statistical model, and the cost function is inversely proportional to the likelihood of M, given the input data.

In various embodiments, classifier process 244 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that classifier process 244 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, classifier process 244 may assess the captured traffic data on a per-flow basis. In other embodiments, classifier process 244 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Classifier generator process 248 may be configured to generate classifier process(es) 244 using, e.g., a training data set regarding traffic flows. In various embodiments, the training data set may comprise captured information regarding the traffic flows. For example, the training data set may include, but is not limited to, information regarding the size of packets in the traffic flows, the durations of the traffic flows, the source and/or destination devices involved in the traffic flows, the applications associated with the traffic flows, application-specific data (e.g., the cryptographic parameters of a transport layer security mechanism, etc.), timestamp information regarding the flows, or any other collected information regarding the traffic flows. In further cases, the training data set may include statistics regarding any of the characteristics of the traffic flows (e.g., averages, maximums, minimums, etc.). For example, the training data set may include the average packet size of each of the traffic flows.

In various embodiments, the training data set that classifier generator process 248 uses to generate classifier process (es) 244 may also include any number of associated classification labels. For example, a simple scheme may label the traffic information in the training data set as either 'malicious' or 'benign.' Another scheme would be to use a set of n-number of labels, where each label indicates the type of malicious behavior observed. In turn, classifier generator process 248 may use this information to train a classifier process 244 to assess whether a malicious traffic flow is present in the network.

Figure 3:
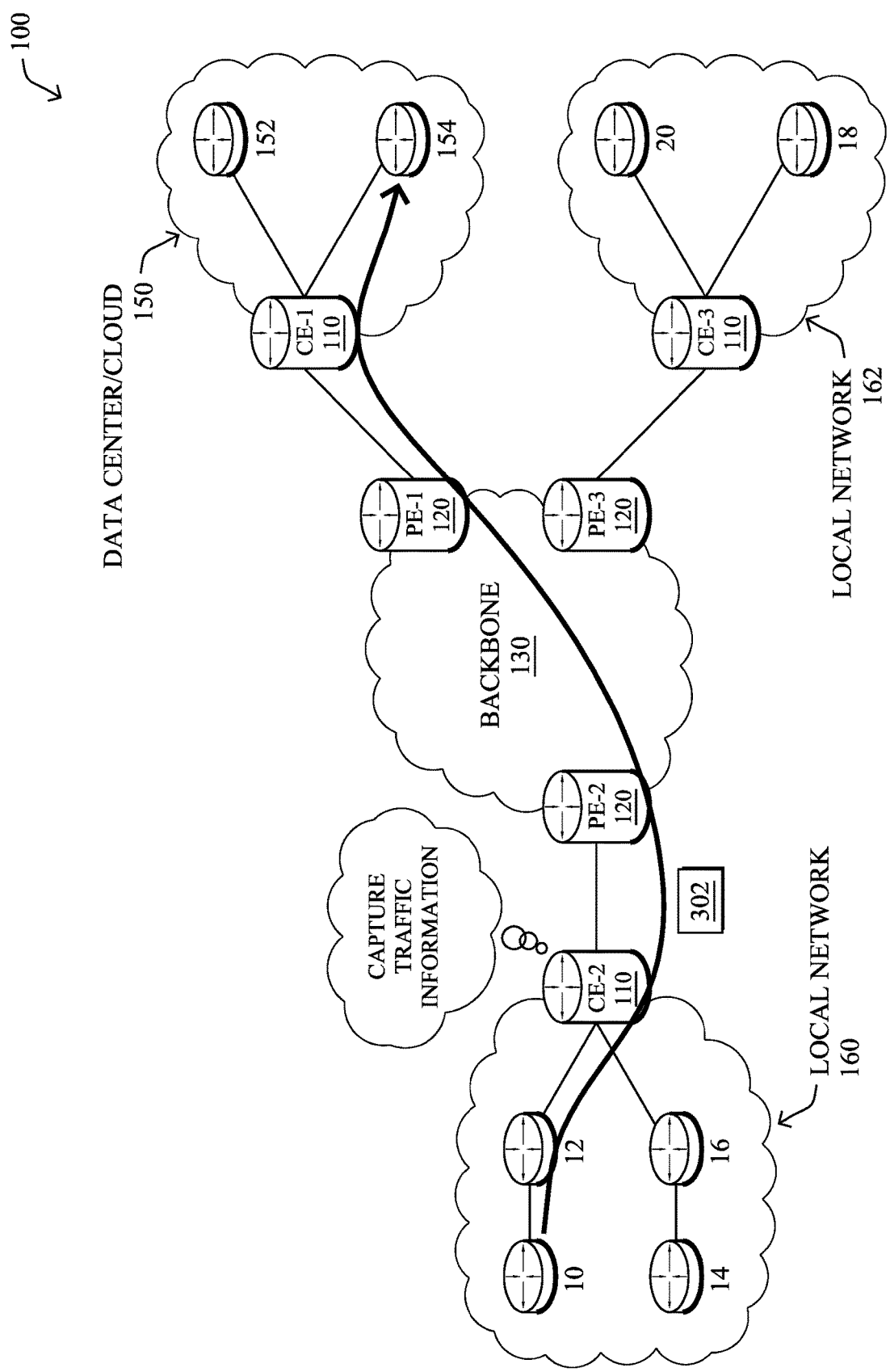
FIG. 3 illustrates an example of a network device capturing traffic data.

As shown in FIG. 3, various mechanisms can be leveraged to capture information about traffic in a network, for purposes of training a classifier and/or using a classifier to classify network traffic. For example, consider the case in which host node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows.

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, machine learning-based classification of network traffic can aid in the detection of network attacks, malware, data exfiltration, and other malicious network conditions. However, the performance of such classifiers is directly related to their training data sets. Thus, a more robust training data set will improve the functioning of a classifier by reducing false positives (e.g., flows incorrectly identified as malicious) and false negatives (e.g., malicious flows that are incorrectly identified as benign).

According to various embodiments herein, a central device may gather labeled traffic data from a plurality of networks, to form a more robust classifier training data set. For example, a networking device manufacturer may have customers across a wide array of different network configurations and industries (e.g., government, banking, etc.). Such entities may employ sophisticated network administrators that have access to large amounts of labeled data relevant to their respective networks (e.g., packet capture files identifying traffic as benign or malicious, etc.). In some embodiments, these entities may opt to share the locally labeled information with the manufacturer or another central system, to build a very robust set of labeled traffic information.

While sharing labeled traffic data with a central system can provide a more robust classifier training data set, certain challenges exist. Notably, many entities may be averse to sharing sensitive data with a central system for privacy reasons, legal reasons, etc. Leveraging this data for purposes of training a classifier remains paramount, however, to ensure that the trained classifier is configured to assess the specific conditions of the network. Thus, the potential training data for a classifier may fall into one of two categories: 1.) data that can be shared with a central device/system and used to form a centrally-curated data set with wide coverage of network behaviors (e.g., both benign and malicious behaviors, and 2.) entity/network-specific data that the entity does not wish to share with the central device/system. To ensure the privacy of both data sets, the data sets need to be kept distinct, the centrally-curated data set cannot be shared across participating entities, and the sensitive data sets cannot be shared with the central system. Because of these constraints, the system cannot use conventional techniques to train a classifier that is finely tuned to the particular network traffic and malware of a given entity.

Adapting Classifier Parameters for Improved Network Traffic Classification Using Distinct Private Training Data Sets The techniques herein allow for the training of a classifier from distinct data sets, while ensuring the privacy of both sets. In some aspects, a first, centrally-curated data set is used to train a generic classifier. For example, the first data set may include labeled network traffic information from a plurality of different networks. In turn, this classifier can be acclimated/adapted for use in a specific network by leveraging a second training data set that is not shared with the central system. To ensure the privacy of the centrally-curated data set, the central system may send only the parameters of the generic classifier to a device in the target network. In turn, a device in the target network may use the second data set (e.g., a private set of labeled traffic data from the target network), to further tune the classifier to the target network.

Specifically, according to one or more embodiments of the disclosure as described in detail below, a device in a first network receives traffic flow information regarding a plurality of traffic flows in the first network. The device labels the traffic flow information by associating classifier labels to the traffic flow information. The device receives a generic traffic classifier that was trained using a training data set that comprises labeled traffic flow information for a plurality of other networks and excludes the traffic flow information regarding the plurality of traffic flows in the first network. The device acclimates the generic traffic classifier to the first network using the labeled traffic flow information regarding the plurality of traffic flows in the first network.

Illustratively, the techniques described herein may be performed by hardware, software, and/or firmware, such as in accordance with the classifier generator process 248, which may include computer executable instructions executed by the processor 220 (or independent processor of interfaces 210) to perform functions relating to the techniques described herein, e.g., in conjunction with classifier process 244.

Figure 4A:
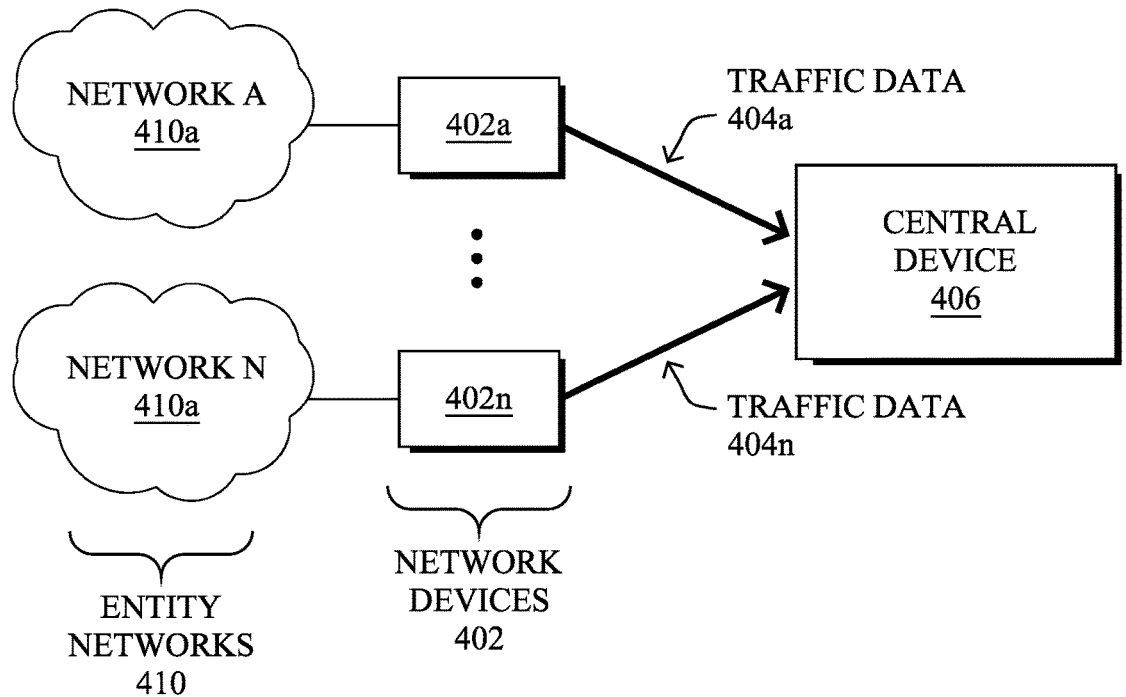
FIGS. 4A-4D illustrate an example of a device adapting a classifier using a private training data set.

Operationally, FIGS. 4A-4D illustrate an example of a device adapting a classifier using a private training data set, in accordance with various embodiments herein. As shown in FIG. 4A, consider the case in which there are a plurality of networks 410 (e.g., a first through nth network). Each of networks 410 may be associated with a different entity (e.g., a business, school, government agency, etc.) and comprise any number of user devices, servers, networking devices (e.g., routers, switches, etc.). Further, the set of applications that generate traffic in each of networks 410 may differ. In some cases, these applications may even include custom applications that are not used outside of a specific network (e.g., only the entity uses the custom application), leading to further differences among the traffic associated with networks 410.

A classifier trained using only traffic information from a single network 410 may lack robustness and the ability to properly assess network conditions that were not present in the training data set. For example, assume that network 410a does not experience a particular type of attack or malware. In such a case, the classifier trained only using the labeled traffic information from network 410a may not be able to properly identify traffic flows associated with the attack or malware as malicious.

According to various embodiments, networking devices 402 (e.g., routers, switches, servers, etc.) associated with entity networks 410 may provide traffic data 404 to a central device/service, for purposes of protecting networks 410 against attacks, malware, and other malicious conditions. In some cases, central device 406 may be part of a cloud-based service, such as ThreatGrid™ from Cisco Systems, Inc. or another such service. For example, networking device 402a associated with entity network 410a may provide traffic data 404a to central device 406 that includes, e.g., captured packets, packet header information, source-destination information, application information, labels (e.g., malicious or benign), statistics, or any other information regarding the traffic in network 410a. Further mechanisms to provide traffic data 404 to central device 406 may include demilitarized zone (DMZ) mechanisms, which central device 406 may leverage such mechanisms, to collect large amounts of benign-labeled traffic data 404 (e.g., based on blacklist filtering).

Networking devices 402 may also control which, if any, traffic data 404 is sent to central device 406. For example, networking device 402a may withhold packets or other traffic data that could include sensitive data (e.g., trade secrets, user privacy data, government secrets, etc.). Thus, a certain portion of the available traffic data may be kept private within the respective networks 410.

Figure 4B:
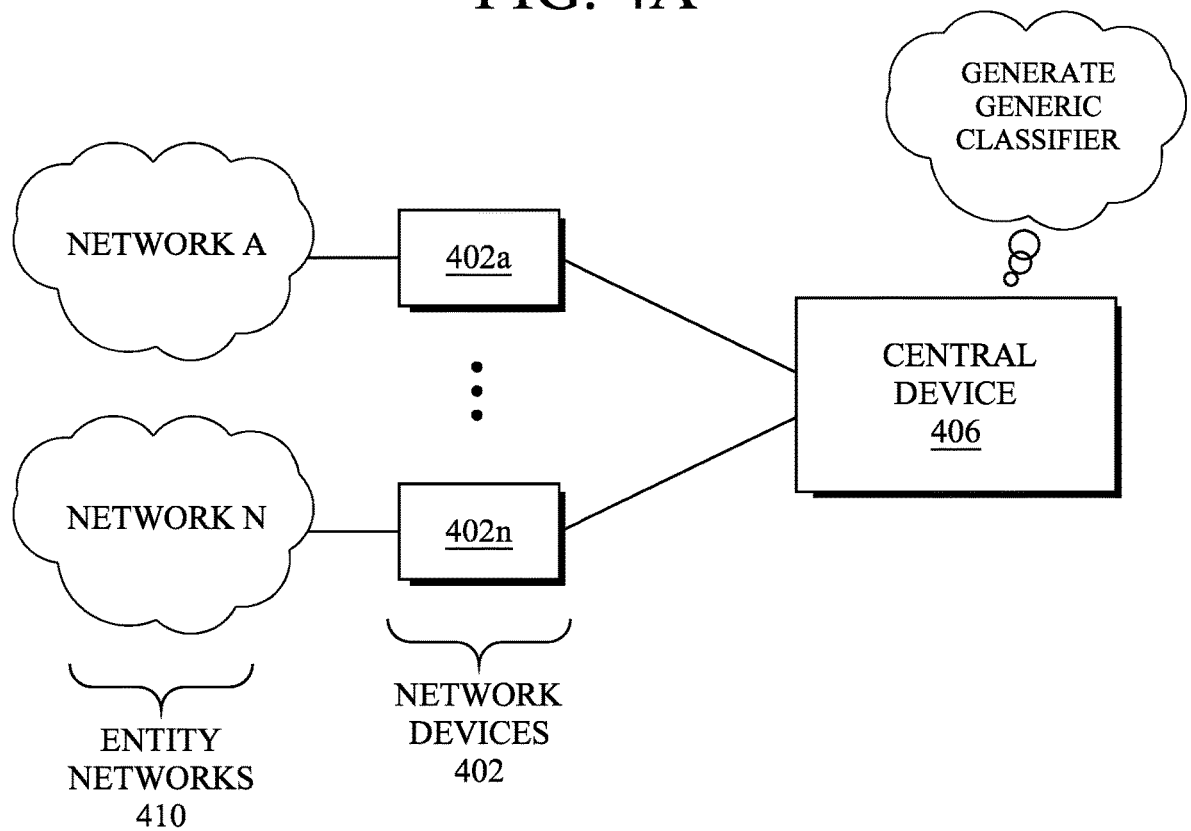

As shown in FIG. 4B, central device 406 may maintain a large repository of the traffic data 406 received from the various networks 410. Such a repository may include malicious packet captures, benign traffic information, etc., that central device 406 can use to train a generic traffic classifier. For example, central device 406 may train an L1-logistic regression classifier using the potentially tens-of-millions of flows in its local repository, yielding a robust classifier with wide coverage. Such a classifier may, for example, classify a traffic flow as malicious or benign based on the characteristics of the flow (e.g., the endpoints of the flow, the duration of the flow, the size of the packets in the flow, the distribution of bytes in the packet payloads, the sequence of packet lengths and times, etc.). As would be appreciated, the techniques herein can support any number of different types of classifiers such as, but not limited to, transport layer security (TLS) classifiers, multi-flow classifiers, and the like.

In various embodiments, local training mechanisms are introduced herein that allow a device 404 in a local entity network 410 to acclimate/adjust the generic classifier trained by central device 406 to the conditions of the local network. Notably, the mechanism does not share the centrally-curated training data set on central device 406, but instead provides only the trained, generic classifier to the networking device 404 (e.g., the parameters of the trained classifier). In turn, the local networking device 404 may use its own local training data set, to adapt/acclimate the generic classifier to the local network. Doing so results in a classification mechanism that is both robust (e.g., by leveraging the large, centrally-curated training data set) and adapted to the local network (e.g., by leveraging the locally-curated training data set).

Figure 4C:
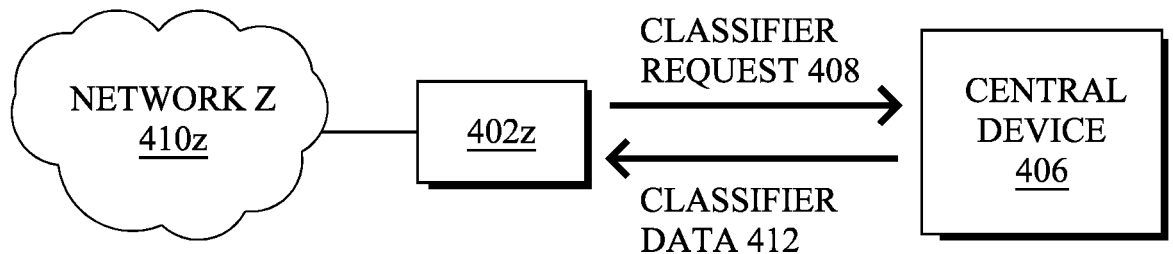

As shown in FIG. 4C, consider the case in which a networking device 402z associated with a network 410z is to deploy a traffic classifier in its local network 410z. As would be appreciated, networking device 402z may or may not belong to the plurality of networking devices 402 that sends traffic data 404 to central device 406. For example, networking device 402z may be an existing client of the central service or may be a new client of the service, in various cases. Regardless, device 402z may send a classifier request 408 to central device 406 for the centrally-trained classifier. In turn, central device 406 may return the parameters of the centrally-trained classifier to networking device 402z for adaptation to network 410z.

Figure 4D:
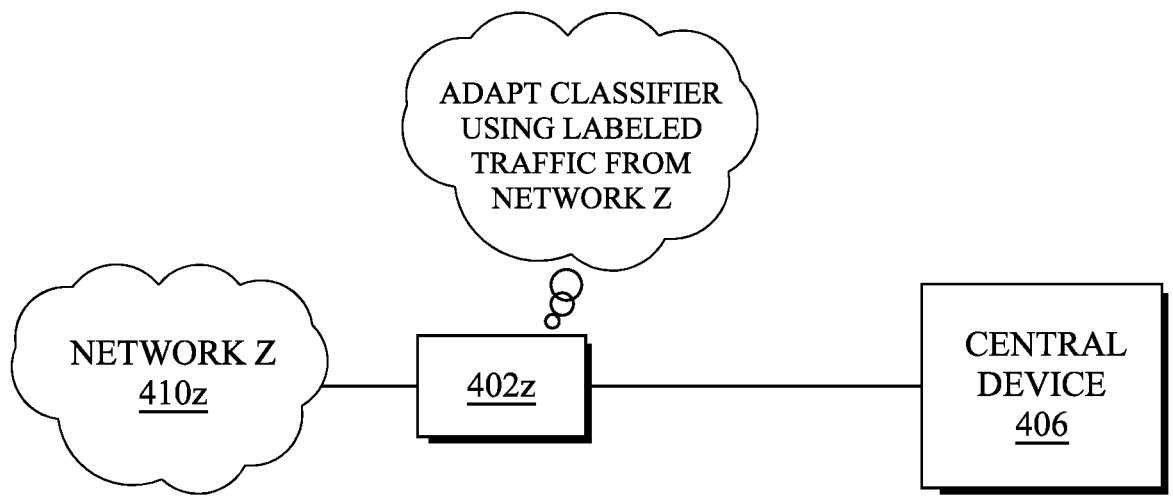

As shown in FIG. 4D, device 402z may adapt/acclimate the generic classifier received via classifier data 412 for use in network 410z. In particular, device 402z may use its own, privately maintained training data set regarding traffic flows in network 410z, to adapt the classifier for local use. Two possible cases exist with respect to the local traffic data regarding network 410z. In a first case, networking device 402z may have examples of both positively and negatively labeled traffic (e.g., examples of both benign and malicious traffic) in network 410z. In a second case, however, networking device 402z may have only examples of one class of traffic. For example, networking device 402z may have only examples of benign traffic in network 410z. The techniques herein address both possible situations.

In one embodiment, device 402z may adapt the generic classifier to network 410z by using its own, private traffic data to train a second classifier. For example, if device 402z has local training data for both classes (e.g., labeled examples of both benign and malicious traffic in network 410z), device 402z may compute a second classifier using this data. In turn, device may use its local classifier in conjunction with the generic classifier from central device 406 and assess the results of both classifiers to classify a given traffic flow. In other words, device 402z may employ both the locally trained classifier and the centrally trained classifier in a manner similar to that of ensemble classifiers.

In another embodiment, device 402z may use stochastic gradient descent to update the parameters of the centrally-trained classifier with the local training data. In general, stochastic gradient descent attempts to minimize a cost function for the selected model parameters with respect to the error (e.g., a least squares cost function, etc.). While other forms of gradient descent or ascent can be used in other embodiments (e.g., batch gradient descent, etc.), stochastic gradient descent does not require analysis of the entire training set before completing a single step, making it well suited for larger training data sets. In other words, stochastic gradient descent may take a more incremental approach to updating the classifier in view of the local training data.

In yet another embodiment, device 402z may take an approach that seeks to penalize deviations from the established parameters (e.g., the parameters of the received classifier) and to penalize errors on the current data set (e.g., the local data set of device 402z). For example, the centrally-trained classifier from central device 406 may be a kernel-based classifier, such as an SVM classifier, and device 402z may use an adaptive SVM approach to adapt the classifier to its local training data set. Notably, device 402z may treat the centrally-trained classifier as a prior model of the classifier to be trained locally and penalize any discrepancies between the parameters of the two, while attempting to minimize classification error. For example, consider the optimization problem of training an SVM classifier as follows:

$$\min \frac{1}{2}\|\beta\|^2 + C\sum_{i=1}^{N}\xi_i$$

where $\beta$ is the set of SVM classifier parameters and $\Sigma\xi_i$ measures the total classification error, and $\|\beta\|^2$ is inversely related to the margin between the training examples of the classes (e.g., benign vs. malicious). Replacing $\|\beta\|^2$ with $\|\beta-\beta'\|^2$ in the above equation, where $\beta'$ represents the parameters of the centrally-trained classifier and $\beta$ represents the new parameters, will result in the system penalizing deviations between the two, while also penalizing errors on the local data set.

Preliminary testing of the above approaches indicates that the adaptive SVM approach may yield the best performance. In particular, approximately two million traffic flows were collected between Jun.-Nov. 2015 across a number of different networks and used to train a generic classifier. This classifier was then adapted to a second set of traffic data captured during Jan. 2016 comprising somewhere between three to ten thousand traffic flows. The validation set used was a distinct set of approximately one hundred thousand flows taken during this same time period. Based on the results, the original classifier had an accuracy of 95.6%, a classifier based on just the second set of traffic data had an accuracy of just 91.2%, and the original classifier when adapted to the second set of data exhibited an accuracy of 98.4%, when using an adaptive SVM approach. This demonstrates that the private, local classifier retraining introduced herein can significantly improve the accuracy of a deployed classifier.

Another situation of concern is when data regarding only one class is available to the local device. For example, device 402z may have a large amount of filtered, benign data, but very little or no examples of malicious traffic. In the case of some amount of the minority class, device 402z may take a bootstrap sampling approach, in combination with the above strategies, to adapt the classifier to network 410z. For example, device 402z may use a heavy penalization to favor the original classifier parameters, if only a small set of local examples are available for one of the classes.

In the case in which no training data at all is available for a particular class, the techniques herein propose using a more conservative scheme of heavier penalization for different parameters and updating the parameters with stochastic gradient descent only on examples with high support.

Initial experiments using this approach are promising, achieving an accuracy of 97.2% on the above-mentioned validation set.

Figure 5:
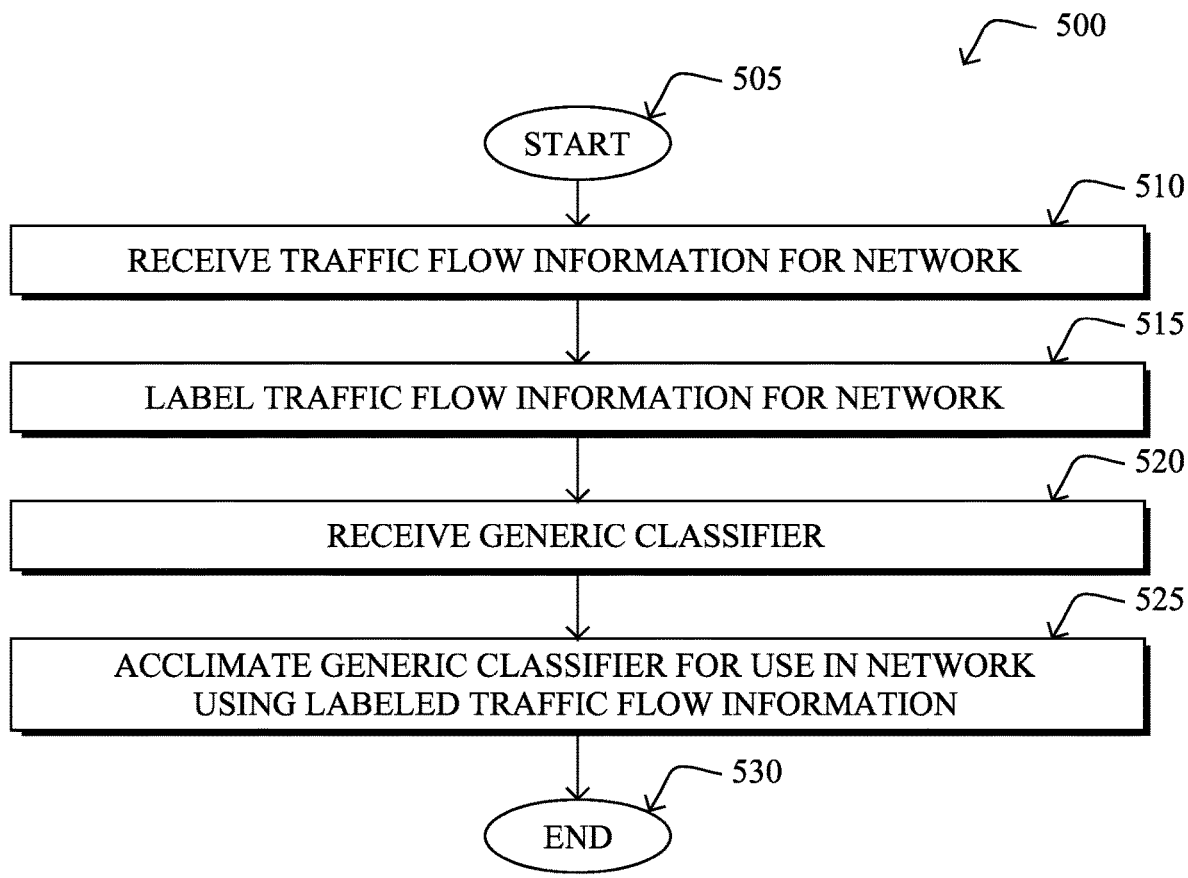
FIG. 5 illustrates an example simplified procedure for acclimating a classifier for use in a network.

FIG. 5 illustrates an example simplified procedure for acclimating a classifier for use in a network, in accordance with one or more embodiments herein. For example, a non-generic, specifically configured device (e.g., device 200) may perform procedure 500 by executing stored instructions (e.g., process 248). The procedure 500 may start at step 505, and continues to step 510, where, as described in greater detail above, the device may receive traffic flow information for a first network (e.g., the local network of the device). For example, the device may receive captured raw packets, packet capture (PCAP) files, traffic flow statistics (e.g., durations, sizes, etc.), packet header information, application identification information, or any other information regarding the traffic in the network. In many cases, the network may be associated with a particular entity, such as a business, school, government body, etc.

At step 515, the device may label the traffic data from step 510 by associating classifier labels to the traffic data, as detailed above. For example, the device may associate "benign" or "malicious" labels with the data for the various traffic flows. In some embodiments, the device may receive such labels from an administrator, such as via a user interface. In other embodiments, the device may rely on existing mechanisms (e.g., blacklists, etc.), to label the data.

At step 520, as described in greater detail above, the device may receive a generic traffic classifier from a central device. In various embodiments, the generic traffic classifier may be trained using a training data set that comprises labeled traffic flow information for a plurality of other networks and excludes the traffic flow information regarding the plurality of traffic flows in the first network. In other words, the training data set for the received classifier may be a robust training data set that takes into account traffic across any number of other networks.

At step 525, the device may acclimate the generic classifier for use in the first network using the labeled traffic data of step 515, as detailed above. In one embodiment, the device may train a second classifier using only the local, labeled traffic data and using this classifier in conjunction with the generic classifier. In another embodiment, the device may update the parameters of the generic classifier using a stochastic gradient approach or the like. In yet another embodiment, the device may use an adaptive approach that employs a cost function that penalizes deviations in the parameters of the generic classifier, when adapting the classifier to the first network. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a traffic classifier that leverages a robust, centrally-curated training data set, as well as a private training data set regarding the target/local network. In some aspects, the techniques provide for the training of a generic classifier using the centrally-curated training data set. The central device then sends the parameters of the classifier to a device in the target network. In doing so, this protects the privacy of the centrally-curated training data. The receiving device then uses its own, private training data set, to adapt the received classifier to the target network. Doing so also ensures the privacy of the local/private data set while improving the classification capabilities of the classifier in the local network.

While there have been shown and described illustrative embodiments that provide for the training of a traffic classifier using a private data set, it is to be understood that various other adaptations and modifications may be made within the spirit and scope of the embodiments herein. For example, while certain embodiments are described herein with respect to using certain form of classifiers, other classifier types can be used as desired.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a device in a first network, traffic flow information regarding a plurality of traffic flows in the first network;
    labeling, by the device, the traffic flow information by associating classifier labels to the traffic flow information;
    receiving, at the device, a generic traffic classifier from a central device outside of the first network, wherein the generic traffic classifier was trained on the central device using a training data set that comprises labeled traffic flow information for a plurality of other networks and excludes the traffic flow information regarding the plurality of traffic flows in the first network where the device is located;
    acclimating, by the device, the generic traffic classifier to the first network using the labeled traffic flow information, wherein acclimating includes adapting the generic classifier to be used in the first network by leveraging the labeled traffic flow information, the labeled traffic flow information comprising a second training data set that is from the first network and is not shared with the central device or the plurality of other networks; and
    using, by the device, the acclimated generic traffic classifier to classify a traffic flow in the first network.

2. The method as in claim 1, wherein the plurality of traffic flows in the first network are associated with a custom application used only in the first network.

3. The method as in claim 1, wherein acclimating the generic traffic classifier to the first network comprises:
    training, by the device, a second traffic classifier using the labeled traffic flow information; and
    combining, by the device, traffic classification results from the generic traffic classifier with traffic classification results from the second traffic classifier.

4. The method as in claim 1, wherein acclimating the generic traffic classifier to the first network comprises:
    updating, by the device, parameters of the generic traffic classifier based on the labeled traffic flow information regarding the plurality of traffic flows in the first network.

5. The method as in claim 4, wherein updating the parameters of the generic traffic classifier comprises:
    using, by the device, stochastic gradient descent to update the parameters of the generic traffic classifier.

6. The method as in claim 1, wherein acclimating the generic traffic classifier to the first network comprises:
    optimizing, by the device, a cost function associated with the generic traffic classifier, wherein the cost function penalizes deviations from established parameters of the generic traffic classifier when adjusting the generic traffic classifier using the labeled traffic flow information regarding the plurality of traffic flows in the first network.

7. The method as in claim 6, wherein the generic traffic classifier is a kernel-based classifier.

8. The method as in claim 1, wherein the generic traffic classifier detects malware.

9. An apparatus, comprising:
    one or more network interfaces to communicate with a first network;
    a processor coupled to the network interfaces and configured to execute one or more processes; and
    a memory configured to store a process executable by the processor, the process when executed operable to:
        receive traffic flow information regarding a plurality of traffic flows in the first network;
        label the traffic flow information by associating classifier labels to the traffic flow information;
        receive a generic traffic classifier from a central device outside of the first network, wherein the generic traffic classifier was trained on the central device using a training data set that comprises labeled traffic flow information for a plurality of other networks and excludes the traffic flow information regarding the plurality of traffic flows in the first network where the device is located;
        acclimate the generic traffic classifier to the first network using the labeled traffic flow information, wherein acclimating includes adapting the generic classifier to be used in the first network by leveraging the labeled traffic flow information, the labeled traffic flow information comprising a second training data set that is from the first network and is not shared with the central device or the plurality of other networks; and
        use the acclimated generic traffic classifier to classify a traffic flow in the first network.

10. The apparatus as in claim 9, wherein the plurality of traffic flows in the first network are associated with a custom application used only in the first network.

11. The apparatus as in claim 9, wherein the apparatus is configured to acclimate the generic traffic classifier to the first network by:
    training a second traffic classifier using the labeled traffic flow information; and
    combining classification results from the generic traffic classifier with traffic classification results from the second traffic classifier.

12. The apparatus as in claim 9, wherein the apparatus is configured to acclimate the generic traffic classifier to the first network by:

updating parameters of the generic traffic classifier based on the labeled traffic flow information regarding the plurality of traffic flows in the first network.

13. The apparatus as in claim 12, wherein the apparatus is configured to update the parameters of the generic traffic classifier by:
using stochastic gradient descent to update the parameters of the generic traffic classifier.

14. The apparatus as in claim 9, wherein the apparatus is configured to acclimate the generic traffic classifier to the first network by:
optimizing a cost function associated with the generic traffic classifier, wherein the cost function penalizes deviations from established parameters of the generic traffic classifier when adjusting the generic traffic classifier using the labeled traffic flow information regarding the plurality of traffic flows in the first network.

15. The apparatus as in claim 14, wherein the generic traffic classifier is a support vector machine (SVM) classifier.

16. The apparatus as in claim 9, wherein the generic traffic classifier detects applications or specific characteristics of malicious traffic.

17. A tangible, non-transitory, computer-readable medium storing program instructions that cause a device in a first network to execute a process comprising:
receiving, at the device, traffic flow information regarding a plurality of traffic flows in the first network;
labeling, by the device, the traffic flow information by associating classifier labels to the traffic flow information;
receiving, at the device, a generic traffic classifier from a central device outside of the first network, wherein the generic traffic classifier was trained on the central device using a training data set that comprises labeled traffic flow information for a plurality of other networks and excludes the traffic flow information regarding the plurality of traffic flows in the first network where the device is located;
acclimating, by the device, the generic traffic classifier to the first network using the labeled traffic flow information, wherein acclimating includes adapting the generic classifier to be used in the first network by leveraging the labeled traffic flow information, the labeled traffic flow information comprising a second training data set that is from the first network and is not shared with the central device or the plurality of other networks; and
using, by the device, the acclimated generic traffic classifier to classify a traffic flow in the first network.

18. The non-transitory computer-readable medium as in claim 17, wherein the device labels the traffic flow information by:
receiving, by the device and via a user interface, labels for the traffic flow information regarding the plurality of traffic flows in the first network.

19. The non-transitory computer-readable medium as in claim 17, wherein acclimating the generic traffic classifier to the first network comprises:
updating, by the device, parameters of the generic traffic classifier based on the labeled traffic flow information regarding the plurality of traffic flows in the first network.

20. The non-transitory computer-readable medium as in claim 17, wherein the generic traffic classifier detects applications or specific characteristics of malicious traffic.

* * * * *